United States Patent [19]
Downie

[11] 3,761,923
[45] Sept. 25, 1973

[54] RADAR SIDE LOBE CANCELLER INPUT EQUALIZER

[75] Inventor: John W. Downie, Dewitt, N.Y.

[73] Assignee: The United States of America as represented by the Secretary of the Army

[22] Filed: Sept. 1, 1972

[21] Appl. No.: 285,944

[52] U.S. Cl. .......................... 343/5 R, 343/100 LE
[51] Int. Cl. .............................................. G01s 7/02
[58] Field of Search ....................... 343/5 R, 100 LE

[56] References Cited
UNITED STATES PATENTS
3,177,489   4/1965   Saltzberg ...................... 343/100 LE
3,202,990   8/1965   Howells ........................ 343/100 LE Primary Examiner—T. H. Tubbesing
Attorney—Harry M. Saragovitz et al.

[57] ABSTRACT

The radar side lobe canceller input equalizer provides interfaces at both inputs and outputs of the main and auxiliary receiver headends. These interfaces are time-division multiplexed so that each channel is alternately used to consecutively transmit simultaneous time increments of the two signals. The signals are restored to their original channel prior to coupling into the side lobe canceller. The amplitude versus frequency characteristics of these output signal portions are no longer dependent on the individual characteristic of each head-end, but on a matched combination of both.

4 Claims, 2 Drawing Figures

RADAR SIDE LOBE CANCELLER INPUT EQUALIZER

BACKGROUND OF THE INVENTION

Through side lobe cancellation the primary or main signal received by a radar system is enhanced by substantial reduction of interference signals. Interference results when radar energy of the signal or near signal frequency impinges on the side lobes of the main antenna. This energy is coupled into the main receiver channel simultaneously with the desired main lobe signal and may also have a phase difference or overriding energy level. This interference energy (undesirable noise) is removed by placing an omnidirectional antenna adjacent to the main antenna. The noise signal is, then, also received by the omni antenna. The respective antennas are coupled to separate radar head-ends and the signals are processed through a side lobe canceller, being ultimately combined to cancel the noize common to both channels.

A serious obstacle in side lobe cancellers of many radar systems is the necessity for matching the radar receiver head-end amplifiers and mixer amplitude versus frequency characteristics. Matching in each channel should be within a fraction of a decibel from the antennas to the noise cancellation point, where the signals are combined.

SUMMARY OF THE INVENTION

The apparatus of the present invention comprises networks which precede and follow the head-ends of the main and auxiliary channels and which connect their outputs to a side lobe canceller. Its purpose is to allow wide variation in head-end tuning without disturbing the precise match between the channels. The main and auxiliary channels feeding a side lobe canceller utilize multiplex transmission so that each channel consecutively transmits simultaneous time increments of these signals. Mismatch is thereby eliminated between the frequency response characteristics in the main and auxiliary channels by rapidly switching between the two channels. Thus half of the time one channel is carrying the auxiliary signal and the other half of the time the same channel is carrying the main signal. Delay lines allow time alignment of the portions of the signal which have passed through the same channel.

DESCRIPTION OF THE PREFERRED EMBODIMENT

Figure 1:
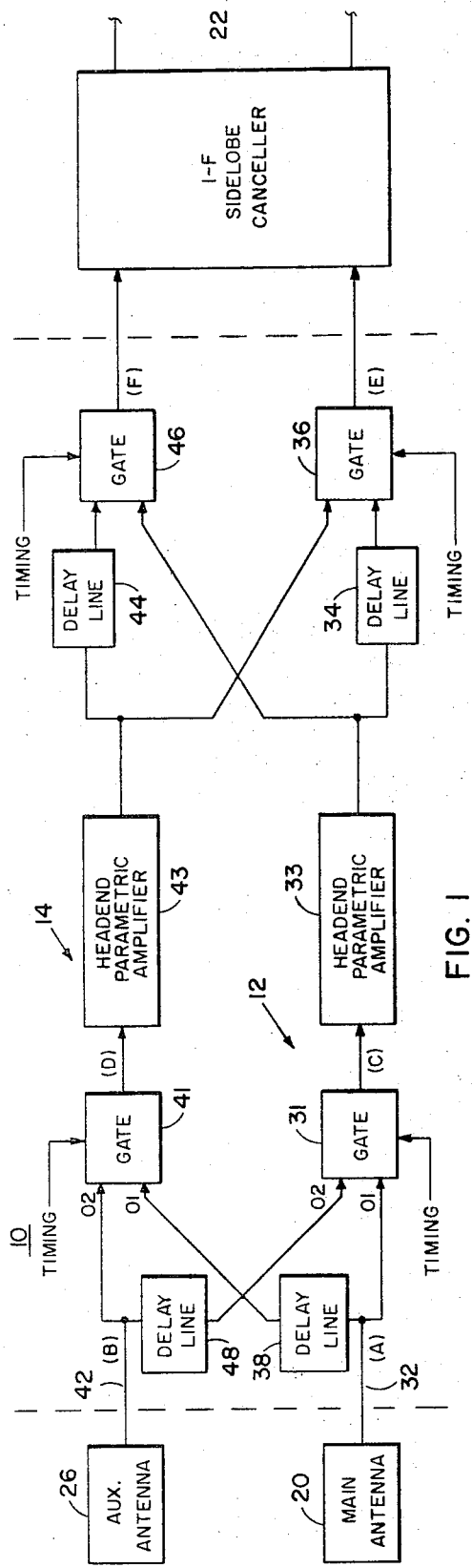
FIG. 1 is a block diagram of a preferred embodiment of the side lobe canceller subsystem in a typical radar system with extraneous matter not shown.

A preferred embodiment of the invention is shown in FIG. 1. A side lobe canceller subsystem 10 comprises a primary or main signal channel 12 and an auxiliary channel 14. Channel 12 is connected between the main radar antenna 20 and the side lobe canceller 22. Typically, the head-end or first stage to receive the signal may be a parametric amplifier 33. Similarly, channel 14 is connected between an auxiliary antenna 26, which may be omnidirectional, through its head-end amplifier 43 to the side lobe canceller 22.

Channels 12 and 14 are identically connected for simultaneously conducting signals therethrough. In channel 12 a timing gate 31 has an input 32 coupled to antenna 20 and an output coupled to the head-end 33. Head-end 33 has an output coupled to a coaxial delay line 34. A timing gate 36 is connected to receive energy from delay line 34 and couple it to side lobe canceller 22. Similarly, auxiliary channel 14 is connected to couple received signals through input 42, timing gate 41, head-end 43, coaxial delay line 44, and timing gate 46 to side lobe canceller 22. A waveguide delay line 38 is also coupled between the main channel input 32 and the auxiliary channel gate 41. Similarly, input 42 is connected through a waveguide delay line 48 to gate 31. An output of head-end 33 is directly coupled to gate 46 and an output of head-end 43 is directly coupled to gate 36. Gates 31 and 41 provide time-division multiplexing of portions of the main and auxiliary input signals. Gates 36 and 46 provide multiplexing of the output signals. Delay lines 34, 38, 44, and 48 allow alignment in time of the signal portions with previous signals which have passed through their respective channels.

Figure 2:
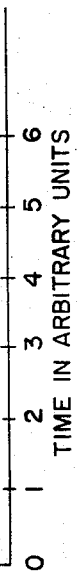
FIG. 2 is a time sequence diagram of signal increments at various positions in the side lobe canceller subsystem of FIG. 1.

FIG. 2 discloses typical signal increments in block form at respective points, (A) through (F), in the side lobe canceller channels. With arbitrary units of time, a signal coupled to input 32, point (A), is time-divided into segments A1, B1, C1, D1, and E1. A similar signal in auxiliary channel 14, at point (B), is segmented into A2, B2, C2, D2, and E2. With gates 31 and 41 simultaneously time multiplexed, signal segment A1 is coupled directly to gate 31 and segment A2 is being delayed in delay line 48. After the delay, A2 is coupled to gate 31. Timing gates 31 and 41 simultaneously accept signals at inputs 01 and, when switched, simultaneously accept signals at respective inputs 02. Gates 36 and 46 are multiplexed similarly. Hence, when segment A1 is accepted by input 01 of gate 31, there is no signal being accepted by gate 41, since input 02 is blocked and input 01 is delayed in delay line 38. Due to time multiplexing of both channels, the signal increments passing through point (C) are A1, A2; C1, C2; and E1, E2. Signal increments passing through point (D) are B2, B1 and D2, D1. Therefore, head-ends 33 and 43 each pass approximately 50% of the energy incident to the adjacent channel.

Delay lines 34 and 44 delay signal segments of their respective channels which have not previously been delayed while directly coupling adjacent channel signals back to the respective channel of incidence. Thus after being time multiplexed in gates 36 and 46, the energy incident to points (A) and (B) is restored in time sequence at points (E) and (F), being shifted in time only as a unit. Having been acted on by both head-end channels, the respective channel frequencies are more uniformly matched when coupled into the side lobe canceller, reducing the necessity for critical channel adjustment of mismatch.

Thus, time-division multiplexing is employed in allowing one channel to handle the main signal half of the time and the auxiliary signal the other half of the time. Delay lines allow the portions of the signal incident to a given channel to be aligned in time when leaving the channel. Mismatch between the frequency response characteristics in the main and auxiliary channels is eliminated by rapidly switching signals between the two channels. When the rate of alternation between channels is large in comparison with the signal bandwidth, delay is achieved with simple passive elements, as waveguide for delay lines 38 and 48 and coaxial cable for delay lines 34 and 44 operating at the intermediate frequency. Energy within the useful passband constitutes a signal which has been acted on equally by the two mismatched head-ends.

The sampling rate is such that either of the two sets of samples at one output terminal is capable of reproducing the corresponding input voltage, as modified by one of the uncontrolled filters, and will do so when passed through a smoothing filter. The output voltage at each terminal after smoothing will be the sum of that due to each train, hence the signal at each terminal will have been acted on by a composite or average of each of the two head-ends. For parametric amplifier head-end, for example, having an upshift from L-band to X-band, radio frequency delay (38 and 48) can be switched in with varactors successively energized by timing gates. Then the second set of gates (36 and 46) can be placed after the intermediate frequency limiters and switched with conventional solid state devices.

Although a particular embodiment and form of this invention has been illustrated, it is obvious to those skilled in the art that modifications may be made without departing from the scope and spirit of the foregoing disclosure. For example, additional auxiliary channels may be utilized with omnidirectional antennas at other critical side lobe reception points and multiplexed with the main signal channel. Therefore, it is understood that the invention is limited only by the claims appended hereto.

I claim:

1. In combination with a radar receiving system having primary and auxiliary receiving antennas coupled to a radar side lobe canceller, the improvement which comprises a radar side lobe canceller input equalizer coupled between respective antennas and said side lobe canceller for reducing the effects of undesireable energy incident to antenna side lobes; said equalizer having primary and auxiliary signal channels connected to respective system antennas, and gating means in common with said channels for time-division multiplexing auxiliary channel signals with said primary channel signals.

2. The radar side lobe canceller input equalizer as set forth in claim 1 wherein each of said channels comprises: an antenna input, a first gate for time-multiplexing signals applied thereto, said gate being coupled to said antenna input; a parametric amplifier having an input connected to an output of said first gate, a second gate for time-multiplexing signals coupled thereto, a delay line connected between said parametric amplifier and said second gate for coupling signals to said gate, and an output connected to said second gate for coupling said gate to the radar side lobe canceller.

3. The side lobe canceller input equalizer as set forth in claim 2 and further comprising first delay means connected between said primary channel input and the first gate of said auxiliary channel, and second delay means connected between the input of said auxiliary channel and the first gate of said primary channel.

4. The side lobe canceller as set forth in claim 3 wherein said first and second delay means are waveguide for delaying microwave frequencies, and said channel delay lines are coaxial cable for delaying intermediate frequencies; and further comprising direct coupling from the outputs of said primary and auxiliary parametric amplifiers to respective second gates of said auxiliary and primary channels.

* * * * *